(12) United States Patent
De Smet et al.

(10) Patent No.: US 9,370,989 B2
(45) Date of Patent: Jun. 21, 2016

(54) HINGE ASSEMBLY WITH CONTINUOUS SEAL FOR A TILTABLE WINDOW OF A VEHICLE CABIN

(71) Applicant: CNH Industrial America LLC, New Holland, PA (US)

(72) Inventors: Raf De Smet, Zedelgem (BE); Jan H. W. Raaben, Sint Andries (BE); Jeroen Vancraeynest, Beverne-Leie (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/403,936

(22) PCT Filed: May 24, 2013

(86) PCT No.: PCT/EP2013/060749
§ 371 (c)(1),
(2) Date: Nov. 25, 2014

(87) PCT Pub. No.: WO2013/174981
PCT Pub. Date: Nov. 28, 2013

(65) Prior Publication Data
US 2015/0145285 A1 May 28, 2015

(30) Foreign Application Priority Data

May 25, 2012 (BE) .................................. 2012/0353

(51) Int. Cl.
*B60J 10/02* (2006.01)
*B60J 1/18* (2006.01)
*B60J 1/00* (2006.01)
*B60J 1/14* (2006.01)
*E05D 7/00* (2006.01)
*E06B 3/34* (2006.01)

(52) U.S. Cl.
CPC *B60J 10/02* (2013.01); *B60J 1/007* (2013.01); *B60J 1/14* (2013.01); *B60J 1/1884* (2013.01); *E05D 7/00* (2013.01); *E06B 3/34* (2013.01); *Y10T 16/522* (2015.01)

(58) Field of Classification Search
CPC ............ B60J 1/14; B60J 1/1884; B60J 10/02; B60J 1/007
USPC ........ 296/190.1, 201, 146.16, 92, 96.11, 96.2
See application file for complete search history.

(56) References Cited

U.S. PATENT DOCUMENTS

| 818,142 | A | * | 4/1906 | Cookell et al. .......... B21B 39/22 414/780 |
| 2,486,408 | A | * | 11/1949 | Holbrook .................. B60J 1/14 296/154 |
| 3,827,207 | A | | 8/1974 | Sharp |
| 3,990,186 | A | | 11/1976 | Gebhard |
| 5,421,125 | A | | 6/1995 | Camp et al. |

(Continued)

FOREIGN PATENT DOCUMENTS

| GB | 1198359 A | 7/1970 |
| NL | 8902122 A | 3/1991 |

*Primary Examiner* — Jason S Morrow
(74) *Attorney, Agent, or Firm* — Patrick M. Sheldrake (57) ABSTRACT

A hinge assembly with continuous seal, includes a hinge shaft, a fixed hinge part and a rotatable hinge part, a fixed frame part and a rotatable frame part, which respectively comprises a parallel profile element and a seal that is affixed continuously to the profile element of the rotatable frame part and configured so that it bridges the distance between the two profile elements in the closed position.

14 Claims, 9 Drawing Sheets

(56) References Cited

U.S. PATENT DOCUMENTS

| | | | |
|---|---|---|---|
| 5,558,741 A * | 9/1996 | Balcerski | B60J 10/0008 156/244.11 |
| 5,791,727 A | 8/1998 | Doescher et al. | |
| 5,893,600 A * | 4/1999 | McManus | B60J 1/001 296/146.16 |

* cited by examiner

HINGE ASSEMBLY WITH CONTINUOUS SEAL FOR A TILTABLE WINDOW OF A VEHICLE CABIN

This application is the US National Stage filing of International Application Serial No. PCT/EP2013/060749 filed on May 24, 2013 which claims priority to Belgian Application BE2012/0353 filed May 25, 2012, each of which is incorporated herein by reference in its entirety.

The invention pertains to a hinge assembly for a tiltable window of a vehicle cabin.

When it comes to vehicles, in particular agricultural vehicles, or vehicles for construction work, it is sometimes necessary to apply a tiltable frame, in particular to clean this window after work in conditions with, for example, a lot of dust. The back of the cabin of a combine harvester often comprises such a window to be able to inspect the content of the grain tank.

A hinge assembly for a tiltable window for a cabin of a vehicle is, for example, known from NL8902122. However, such a construction where the hinges are affixed at the top or alternatively at the bottom is not always suitable for such applications. It is then not always possible to open the window by tilting it to the outside because, for instance, the space between the grain tank and the cabin is so limited that the window cannot be tilted open insufficiently and access to the outer side of to the window is not possible. If such a window is tilted inward, then the accumulated dust and moisture that have collected around the seal of this window fall to the inside of the cabin and it is difficult to seal such a frame off well against moisture from the outside.

A sliding window with a continuous seal, such as known from U.S. Pat. No. 5,421,125, also does not provide any solution, in particular in a situation where the space outside the cabin is limited, since the sliding window is not accessible in order to be cleaned.

It is therefore recommended to apply a tiltable window, whereby the hinges are affixed between the top and bottom so that the bottom part of the window tilts to the outside to not allow the dust and moisture inside the cabin and the top part tilts inwards to be accessible, for example, in order to be able to be cleaned.

However, there is also a problem with such windows, since at the height of the hinges, in known embodiments, the seal needs to be interrupted. This creates problems with airborne dust; it forms a risk for moisture problems and shields insufficiently against airborne noise. Moreover, it was established that the seal is exposed to large frictional forces in the vicinity of such hinges which limits the longevity of the seal.

There is consequently a need for a hinge assembly for a tiltable window for a cabin of a vehicle that faces the above-mentioned disadvantages.

According to a first aspect of the invention there is provided a hinge assembly for a tiltable window for a cabin of a vehicle, the hinge assembly comprising:
- a hinge shaft that is mounted according to a transverse direction, at right angles with respect to a depth direction, and both of these directions also at right angles with respect to a longitudinal direction;
- a fixed hinge part and a rotatable hinge part, configured to rotate relative to the fixed hinge part around the hinge shaft;
- a fixed frame part and a rotatable frame part whereon, in the depth direction, on top, respectively the fixed hinge part and the rotatable hinge part are mounted, whereby this fixed frame part extends according to the longitudinal direction on either side of the hinge shaft and whereby this rotatable frame part is configured to rotate between at least two positions:
  a first, closed position in which, viewed in the transverse direction, the rotatable frame part on both sides of the hinge shaft is approximately in line with the fixed frame part, and
  a second, open position in which, viewed in the transverse direction, the rotatable frame part is at an angle relative to the fixed frame part; and
- a seal mounted between the fixed frame part and the rotatable frame part, CHARACTERIZED IN THAT
the fixed frame part and the rotatable frame part, respectively comprise continuous, substantially parallel, profile elements that extend to the bottom according to the depth direction; and
the seal is mounted continuously to the profile element of the fixed or rotatable frame part and is configured so that it bridges the distance between both profile elements in the closed position.

The hinge assembly, according to the invention, makes it possible to realize a continuous seal for this type of hinge assembly, even at the height of the hinges, whereby a better attenuation of the noise and a better shielding against dust and moisture are realized.

According to a preferred embodiment, the fixed and the rotatable frame part in the closed position, according to the longitudinal direction, comprises three zones: a first zone at a first side of the hinge shaft up to a first endpoint; a second zone on the opposite side of the hinge shaft up to a second endpoint; and a transition zone at the height of the hinge shaft, located between the first zone and the second zone from the first endpoint to the second endpoint, and at least at the height of the transition zone in the closed position, both profile elements, seen according to the depth direction, are at an angle relative to the longitudinal direction.

As a result, the friction on the seal at the height of the hinge is reduced significantly which prolongs the longevity of the seal and the efficient functioning of the seal.

According to a preferred embodiment, the hinge assembly is implemented so that:
in the first zone:
  the fixed frame part comprises, seen according to the depth direction, below the seal, a transverse profile element which is connected to the profile element of the fixed frame part and at least extends, according to the transverse direction, up to the parallel profile element of the rotatable frame part; and
  the rotatable frame part, seen according to the depth direction, at the upper side of the seal, comprises a second transverse profile element that at least extends, according to the transverse direction, from the profile element up to the parallel profile element of the fixed frame part.
in the second zone:
  the rotatable frame part, seen according to the depth direction below the seal, comprises a transverse profile element that is connected to the profile element of the rotatable frame part and extends at least up to the parallel profile element of the fixed frame part, according to the transverse direction; and
  the fixed frame part, seen according to the depth direction, at the upper side of the seal, at least extends according to the transverse direction from the profile element up to the parallel profile element of the rotatable frame part.

And/or in the transition zone:
  the rotatable frame part, seen according to the depth direction, below the seal, comprises a transverse profile element that is connected to the profile element of the rotatable frame part and at least extends, according to the transverse direction, up to the parallel profile element of the fixed frame part; and
  the rotatable frame part, seen according to the depth direction, at the upper side of the seal, comprises a second transverse profile element that extends at least, according to the transverse direction, from the profile element to the parallel profile element of the fixed frame part.

This additionally enables optimal protection of the seal against moisture in these zones, for example, when the seal is exposed to a cleaning operation with a high pressure cleaner.

Optionally, at the height of the first endpoint, the transverse profile element of the fixed frame part forms an abutment for the transverse profile element of the rotatable frame part.

The seal preferably comprises a balloon-shaped component.

This allows to cope with the tolerances on the distance between the individual profile elements.

The balloon-shaped component can optionally comprise an abutment inside that limits the compressibility according to the transverse direction.

According to a further embodiment, the seal is provided with a friction-reducing layer at its contact surface.

This further increases the longevity of the seal.

According to a second aspect of the invention, a tiltable window for a vehicle cabin is provided that comprises two hinge assemblies according to the first aspect of the invention, characterized in that:
  Both hinge assemblies are mounted on opposite sides of the window;
  The hinge shafts of both hinge assemblies are in line with one another.

This allows for the realization of a tiltable window with a continuous seal according to the invention.

According to a preferred embodiment, the first zone of both hinge assemblies is connected to each other and the second zone of both hinge assemblies is connected to each other.

As a result, the profiles of the window can be manufactured in a simple manner.

According to a third aspect of the invention, there is provided a vehicle with a tiltable window according to the second aspect of the invention, characterized in that the vehicle comprises a cabin in which the tiltable window is mounted and that the hinge assemblies are fitted so that:
  the first zone forms the upper part of the window and the second zone the lower part of the window; and
  the first zone of the rotatable frame part in the opened position is tilted to the inner side of the cabin and the second zone of the rotatable frame part to the outside of the cabin.

As a result, the risk that, when opening the window, dust at the height of the hinge assembly will fall into the cabin, is greatly reduced.

The first zone is preferably larger than the second zone. This limits the distance by which the tiltable window protrudes to the outside in the open position.

According to an embodiment, the vehicle comprises a structure at a specific distance from the tiltable window and the hinge assemblies are mounted such that the rotatable frame part does not bridge this distance in the opened position.

This allows to fit the tiltable window so that it can be opened sufficiently in order to be cleaned in an ergonomic way, even if the window is located in the vicinity of a structure of the vehicle.

This situation occurs when, for example, the vehicle is a combine harvester, the structure is a grain tank and the tiltable window is mounted in a rear wall of the cabin.

The invention will now be further described by means of the drawings in which.

Figure 1:
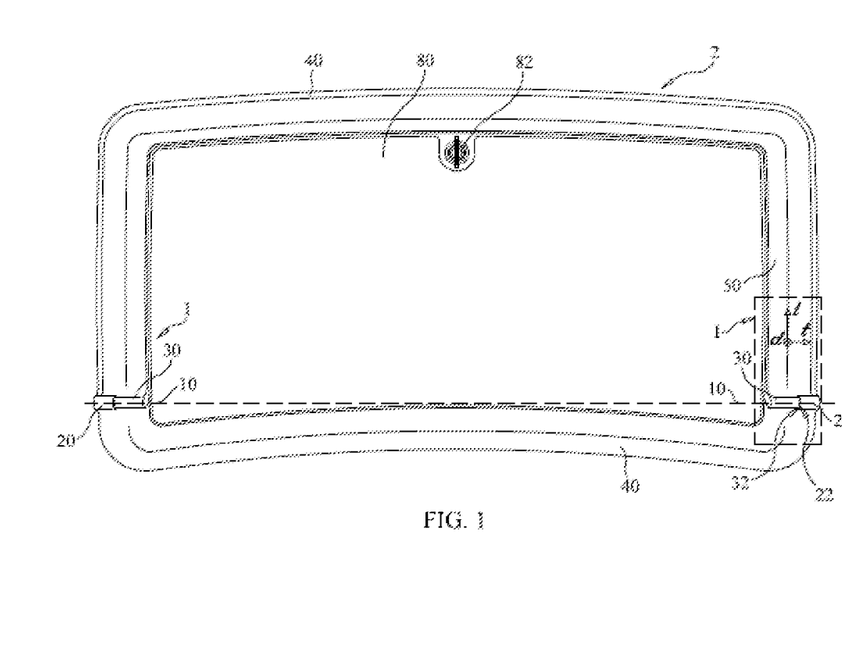
FIG. 1 schematically displays a tiltable window according to the invention.

FIG. 1 schematically displays a tiltable window 2 for a cabin 3 of a vehicle. There are shown two hinge assemblies, 1 both of which are mirror symmetrically mounted. In addition, the hinge shafts 10, around which the tiltable window 2 can tilt, are also in line with one another. The tiltable window 2 comprises glass 80 that is mounted in a rotatable frame 50. This rotatable frame 50, in turn, is tiltably connected via the hinge assemblies to a fixed frame 40 that is mounted to the frame of the cabin 3 of the vehicle.

As can be seen in FIG. 1, the hinge shaft 10, which can be formed as the longitudinal axis of a cylindrical pin or bolt, has been mounted according to a transverse direction: t. In the interest of a clear description, we will maintain the following convention throughout this specification to indicate a relative direction. This transverse direction t is at right angles to the depth direction d and both these directions, d and t, are also at right angles with respect to a longitudinal direction: l. The longitudinal direction l approximately follows the longitudinal direction of the elongate portions of the frame of window 2.

Furthermore, the hinge assembly 1 comprises a fixed hinge part 20 and a rotatable hinge part 30. This rotatable hinge part 30 cooperates with the hinge shaft 10 in order to rotate with respect to the fixed hinge part 20. This can, for example, be realized by implementing the hinge shaft as a cylindrical pin, bolt or shaft and to provide corresponding holes in the hinge parts 20, 30 according to the transverse direction t, and additionally to provide the hinge parts 20, 30 of a contact surface 22, 32 according to the longitudinal direction l. According to alternative embodiments, the hinge shaft 10 can be formed integrally with one of the two hinge parts 20, 30, and at least be introduced partially into a corresponding opening in the other hinge part 30, 20. It is clear that still other variant embodiments of known hinge shafts and the corresponding hinge parts are suitable to be used in the hinge assembly according to the invention.

Figure 2A:
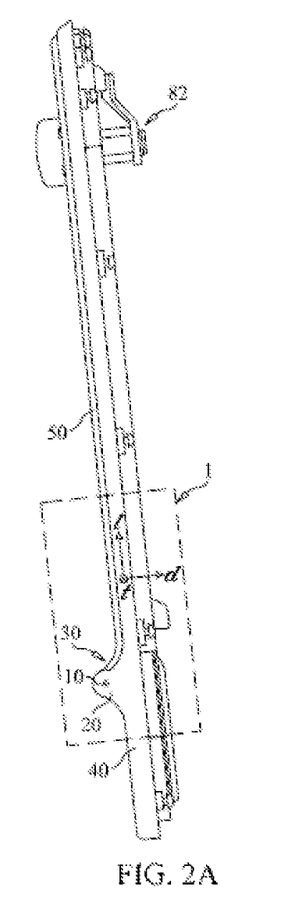
FIGS. 2A and 2B schematically displays a side view of the window in FIG. 1, once in the open position and once in the closed position.
Figure 2B:
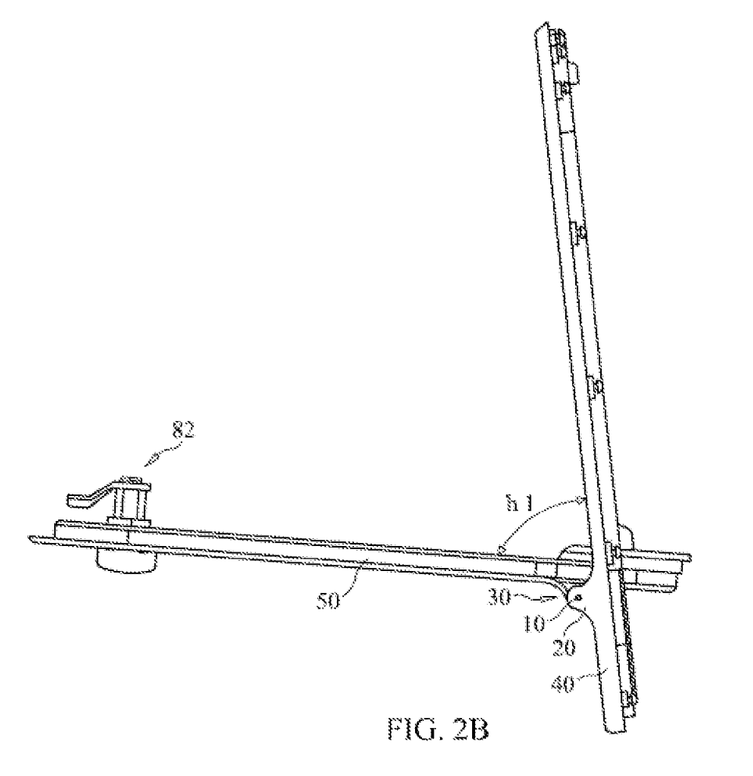

As will be described in more detail further on, the fixed frame part 40 and the rotatable frame part 50 are profiled and elongated, that is to say, a slat-shaped structure that, for example, is extruded from suitable synthetic material, alternatively also metals such as steel or aluminium, or any other suitable material is also possible. On top of the fixed frame part 40, that is to say, according to the depth direction d, the fixed hinge part 20 is mounted as shown in FIGS. 1 and 2. The corresponding rotatable hinge part 30 is mounted on top, also in accordance with the depth direction d, of the rotatable frame part 50.

As can be seen in FIGS. 2A and 2B, the fixed frame part 40 extends, according to the longitudinal direction l on either side of the hinge shaft 10. The rotatable frame part 50 can then again be rotated between at least two positions. That is to say, between a first, closed position and a second, open position. At the first, closed position, seen in FIG. 2A, the rotatable frame part 50 is located on either side of the hinge shaft 10, approximately in line with the fixed frame part 40, when looking in accordance with the transverse direction t. In FIG. 2B, the second, open position is shown whereby, likewise, seen according to the transverse direction t, the rotatable frame portion 50 is at an angle h1 with respect to the fixed frame part 40. The maximum angle for h1 is, for example, approximately 90°. In this position, window 2 is easily accessible for an operator to, for example, clean it.

Figure 3:
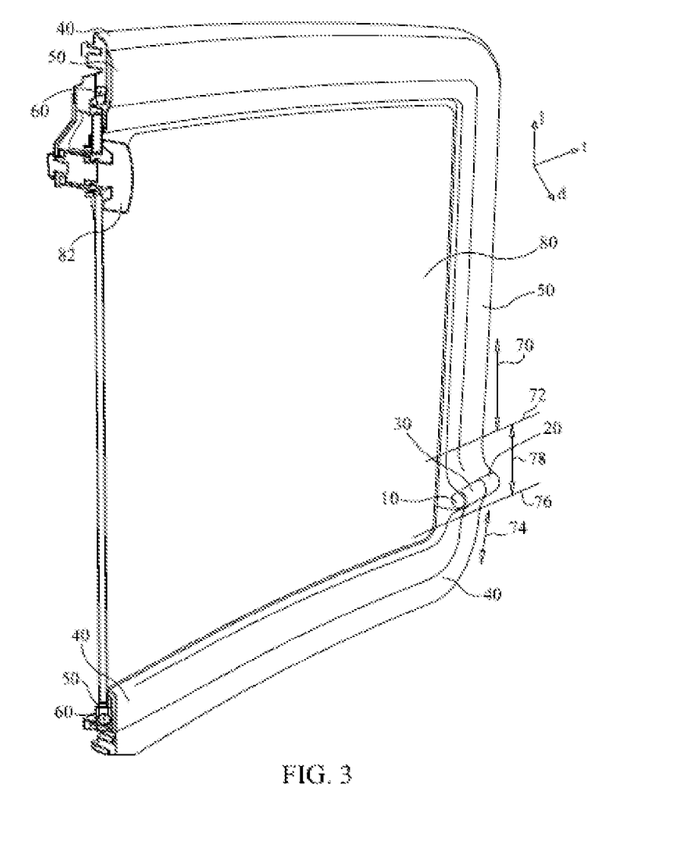
FIG. 3 displays the different zones of a hinge assembly for the window in FIG. 1.

FIG. 3 displays the window of FIGS. 1 and 2 in more detail, as well as a seal 60. This seal 60 is mounted between the fixed frame part 40 and the rotatable frame part 50 to keep dust, moisture and noise in the closed position outside of the cabin, as well as seal off the cabin hermetically from the outside air, for example, in the vicinity of harmful substances. Furthermore, a lock 82 is also visible. Such a known lock 82 allows for the tilting window 2 to be locked in a simple and sure way by turning the clamp, which hooks behind the fixed frame part 40 as depicted in FIG. 3, sufficiently, for example by a quarter turn, whereby the clamp detaches itself and the rotating frame part 50 is unlocked.

As shown in FIG. 3, the fixed frame part 40 and the rotatable frame part 50 of a hinge assembly, according to the invention, in the closed position comprise three zones 70, 74, 78, more specifically, according to the longitudinal direction l. A first zone 70 is located on a first side of the hinge shaft 10 and runs from the upper side of the window up to a first endpoint 72. The hinge assembly 1 further comprises of a second zone 74 on the opposite side of the hinge shaft 10 that runs from a second endpoint 76 to the bottom of the window. Finally, the hinge assembly 1 also comprises a transition zone 78. This transition zone 78 is located at the height of the hinge shaft 10 and is located between the first zone 70 and the second zone 74. The transition zone 78 thereby extends from the first endpoint 72 of the first zone 70 to the second endpoint 76 of the second zone 74.

As can be seen in the preferred embodiment shown in FIGS. 4 to 9, the fixed frame part 40 and the rotatable frame part 50 each comprise, in accordance with the depth direction (d) downwardly extending, continuous profile element 42, 52. Both these profile elements 42, 52 run approximately parallel. In this embodiment, the rotatable frame part 50, to which the glass 80 is mounted, extends transversely up to the profile element 52. From this profile element 52, the rotatable frame part 50 is transversely extended by a second transverse profile element 56, which, with regard to FIGS. 6A and 6B, will be described in more detail below. The profile element 42, the profile element 52, which is shifted approximately parallel with it, and this second transverse profile element 56 form, as can be seen, a U-shaped holder. In this U-shaped holder, and thus between both these protruding profile elements 42, 52, the seal 60 is located. This seal is, according to this embodiment, constructed as a seal with a balloon-shaped component 62, as can be seen in more detail in FIG. 10. The seal 60 is affixed, for example, by means of a suitable adhesive compound, on the inside of the U-shaped holder to the profile element 52 of the rotatable frame part 50, that is to say on the side of the profile element 52 that is located on the opposite side of the profile element 42. The seal 60 is continuous, that is to say without interruptions, at least at the height of the hinge assembly 1, but preferably around the entire circumference of the tiltable window 2. The seal 60 is also wide enough in the closed position in order to bridge the distance between the two profile elements 42 and 52 so that a secure sealing of the space between the fixed frame part 40 and the rotatable frame part 50 is created. However, in particular at the height of the hinge shaft 10, the seal 60 would be exposed to prolonged and intense frictional forces during movement of the rotatable frame part 50. In order to cope with this, as can be seen best in the cross-section of FIG. 7, both the profile elements 42, 52 are mounted at an angle h2 with respect to the longitudinal direction l at the height of the transition zone 78. That is to say, viewed along the depth direction d, when the rotatable frame part 50 is in the closed position. As a result, the contact surface of the seal 60, which makes contact with the profile element 42 of the fixed frame part 40, will move transversely away from the profile element 42 during opening, see for example also FIGS. 8 and 9. This will sensitively decrease the frictional forces during this movement, which will benefit the longevity of the seal 60.

Figure 4:
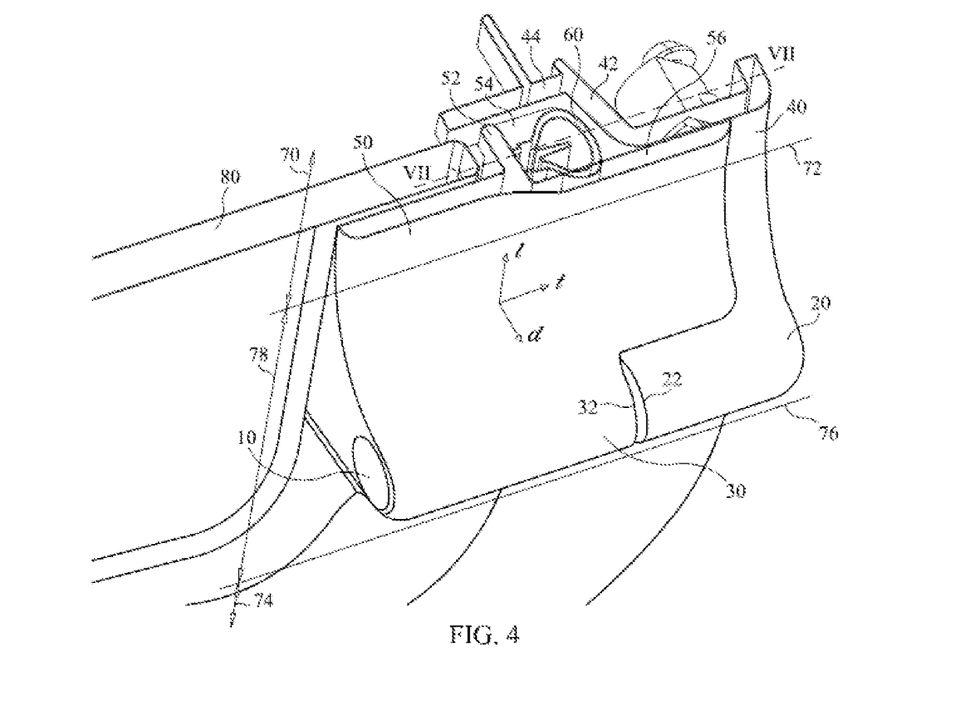
FIG. 4 displays a cross-section in the first zone for the hinge assembly in FIG. 3.

FIG. 4 displays the profiles of the frame parts 40, 50 in the first zone 70. According to this preferred embodiment, the fixed frame part 40, seen according to the depth direction d under the seal 60, also comprises a transverse profile element 44. This transverse profile element 44 is connected to the profile element 42 of the fixed frame part 40. As can be seen, the transverse profile element 44 extends in accordance with the transverse direction t. The transverse profile element 44 runs thereby from the profile element 42 up to at least the parallel profile element 52 of the rotatable frame part 50. Further, the second transverse profile element 56 of the rotatable frame part 50 is located on the upper side of the seal 60, that is to say, viewed along the depth direction d. Thereby, the second transverse profile element 56 extends to at least from the profile element 52 up to the parallel profile element 42 of the fixed frame part 40. As a result, the seal 60, both above and below, is surrounded on the one hand by the second transverse profile element 56 and on the other hand by the transverse profile element 44, which extend according to the transverse direction t. This allows the seal 60 to be clamped between these last two elements whereby, in particular when the seal comprises a balloon-shaped component, the seal will expand in accordance with the transverse direction t to closely join against the contact wall of the profile element 42 of the fixed frame part 40. As clearly indicated in FIG. 4, the second transverse element 56 of the rotatable frame part 50 can extend beyond the parallel profile element 42. It is equally possible that the transverse profile element 44 extends beyond the profile element 52 so that the seal 60 cannot be pushed through possible minute openings when locking the tilting frame 2.

Figure 5:
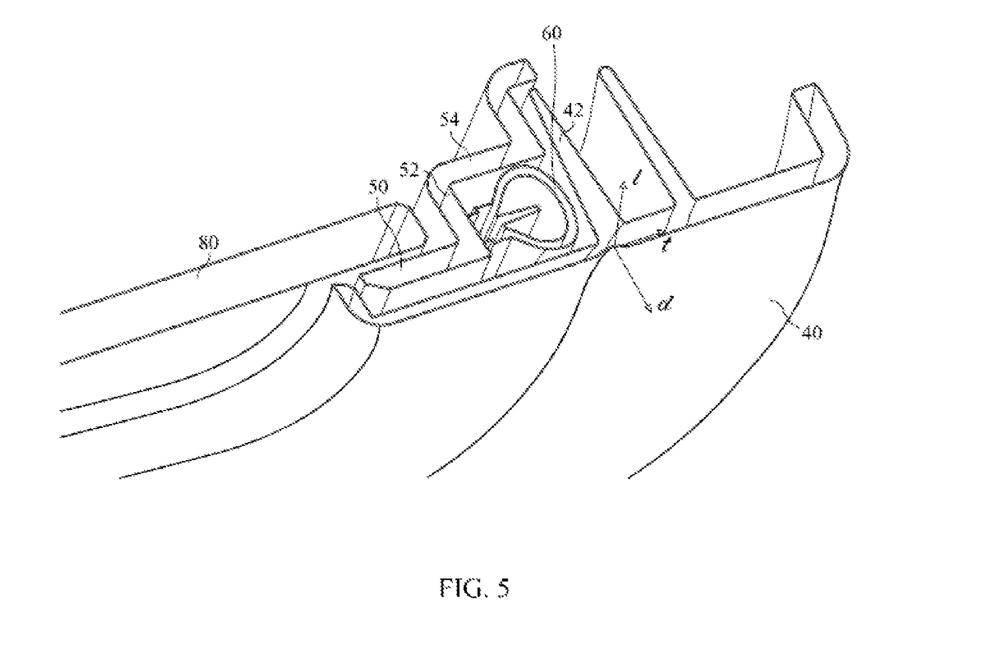
FIG. 5 displays a cross-section in the second zone for the hinge assembly in FIG. 3.

FIG. 5 displays the profiles of the frame parts 40, 50 in the second zone 74. The rotatable frame part 50, seen according to the depth direction d under the seal 60, preferably comprises a transverse profile element 54. This transverse profile element 54 is connected to the profile element 52 of the rotatable frame part 50. The transverse profile element 52 thereby extends up to at least the parallel profile element 42 of the fixed frame part 40, that is to say, according to the transverse direction t. Additionally, the fixed frame part 40 is located, viewed in the direction of the depth direction d, at the upper side of the seal 60. The fixed frame part 40 extends, according to this preferred embodiment, at least from the profile element 42 up to the parallel profile element 52 of the rotatable frame part 50, more specifically, according to the transverse direction t. Here too, this ensures that the balloon-shaped component 62 of the seal 60 is compressed, and thus expands, according to the transverse direction t, so that a secure sealing is formed between the two profile elements 42 and 52.

The roof-tile-shaped structure of the frame parts 40, 50, as can be seen in FIGS. 4 and 5, which mutually overlap each other at least in the first zone 70 and the second zone 74 at the height of the profile elements 42, 52, ensures that, in a closed condition, the space between the profile elements 42, 52, wherein the seal 60 is fitted, is additionally protected against moisture and dust. This allows ensuring an additional optimal protection of the seal 60 against moisture in these zones, for example, when the seal 60 is exposed to a cleaning operation with a high pressure cleaner.

Figure 6A:
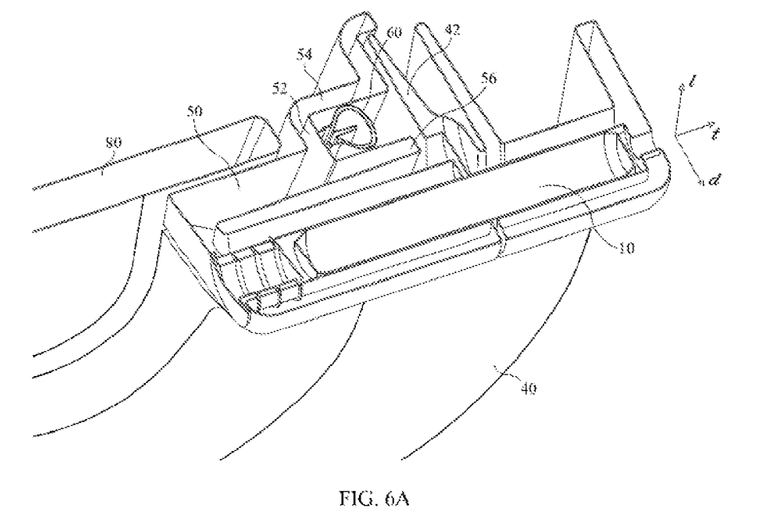
FIG. 6A displays a cross-section in the transition zone for the complete hinge in FIG. 3.

Finally, according to this preferred embodiment the profiles in FIGS. 4 and 5 are connected to the profile of the transition zone 78 that is shown in FIG. 6A. The transverse profile element 54 is there also present under the seal 60, but in this case on the upper side of the seal the second transverse profile element 56 of the rotatable frame part 50 is located. This second transverse profile element 56 is provided at the height of the transition zone 78 in order to obtain a good sealing after the closing of the window. Once again, the rotatable frame part 50 extends itself at least from the profile element 52 up to the parallel profile element 42 of the fixed frame part 40. This allows for the zone of the hinge shaft 10 to be bridged without having the seal 60 interrupted. Furthermore, here the distance between the first transverse profile element 54 and the second transverse profile element 56 can be chosen so that the balloon-shaped component 62 of the seal is sufficiently compressed to expand in accordance with the transverse direction t so that a secure contact with the profile element 42 in the closed condition is ensured.

Figure 6B:
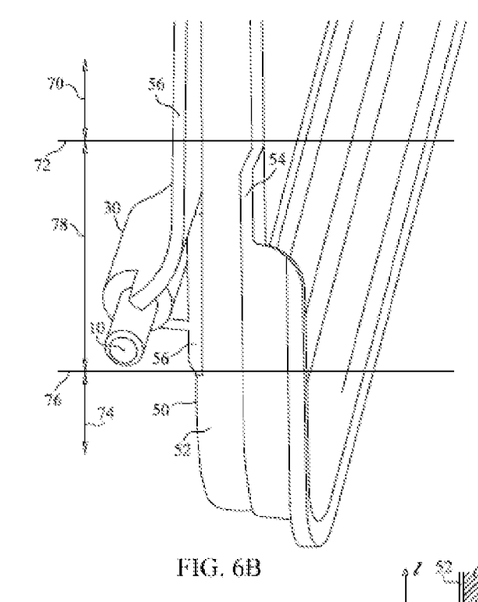
FIG. 6B displays an additional view of the transition zone for a part of the hinge assembly in FIG. 6A.
Figure 7:
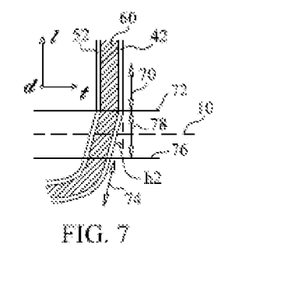
FIG. 7 schematically displays a cross-section of the line VII-VII in FIG. 4.

FIG. 6B displays only the embodiment of the rotatable frame part 50 of the hinge assembly 1, without the seal 60 being present, in order to clarify the course of the respective profile elements, as described above, with respect to FIGS. 4, 5 and 6A. It is also clearly visible, as already shown in FIG. 6A, that the second transverse profile element 56, in the transition zone 78 at the height of the rotatable hinge part 30, according to the transverse direction t, only extends as far as the profile element 42 of the fixed frame part 40, and thus no longer, as in the first zone 70 (also visible in FIG. 4), overlaps this profile element 42 according to the transverse direction t.

Figure 8:
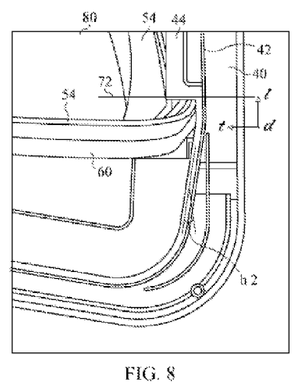
FIG. 8 displays a different view of the hinge assembly in FIG. 3 in the open position.
Figure 9:
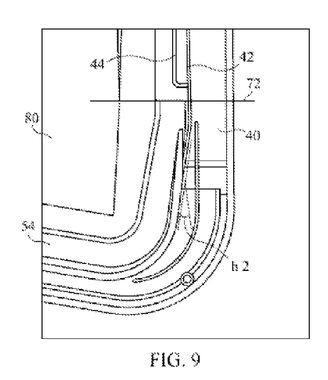
FIG. 9 displays the view of FIG. 8 in the closed position.

As can be seen in FIGS. 8 and 9, which give another view of the profiles of the frame parts 40, 50, the transverse profile element 44 of the fixed frame part 40 at the level of the first endpoint 72, forms in this embodiment an abutment for the transverse profile element 54 of the rotatable frame part 50. In this way, a simple limitation of the maximum angle h1, over which the rotatable frame part 50 can move, can be realized.

Figure 10:
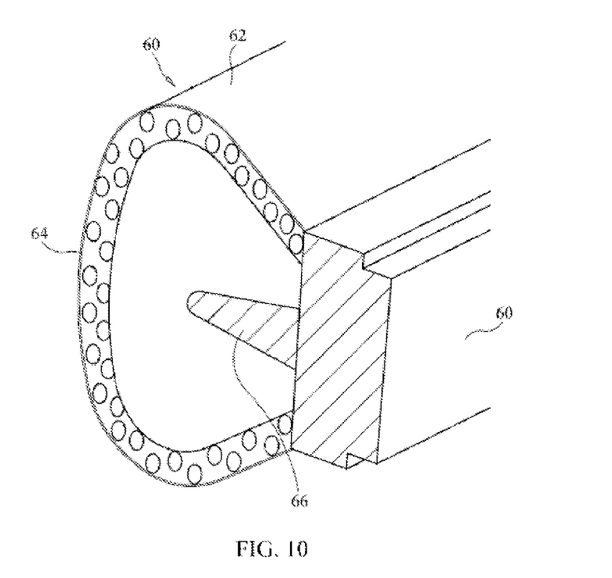
FIG. 10 displays a detail of an embodiment of the seal.

The seal 60 with a balloon-shaped component 62 is displayed in more detail in FIG. 10. As can be seen, the balloon-shaped component 62 is formed from an elastic synthetic material that is provided with cavities in function of the setting of the desired elasticity. In addition, the balloon-shaped component 62 comprises an optional inner abutment 66. This abutment 66 allows limiting the compressibility of the seal 60 according to the transverse direction t when it is mounted. Finally, the seal 60 is provided with a friction reducing layer 64 at its contact surface. This benefits the longevity of the seal 60, in particular at the height of the contact surface that in the closed position comes into contact with the profile element 42 of the fixed frame part 40.

Figure 11:
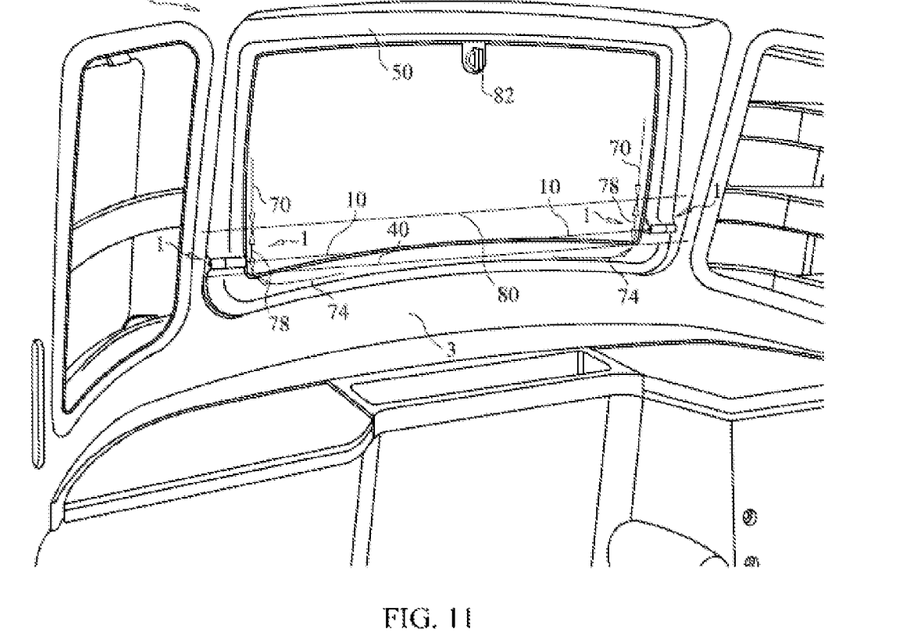
FIGS. 11 and 12 display the inside views of a vehicle cabin with a window according to the invention in an open and closed position, and FIGS. 13 and 14 display corresponding outside views of the cabin in FIGS. 11 and 12.
Figure 12:
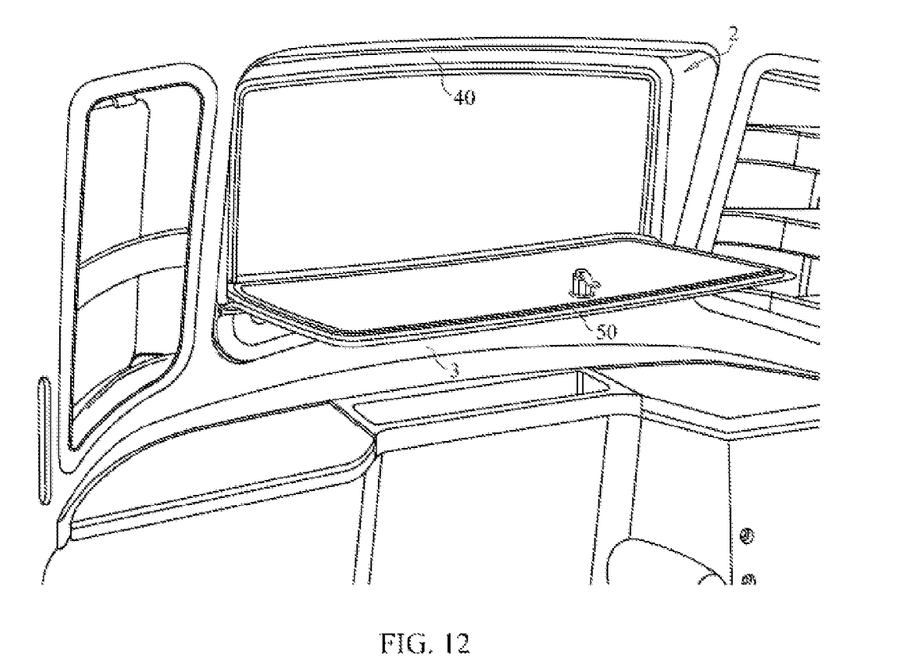
Figure 13:
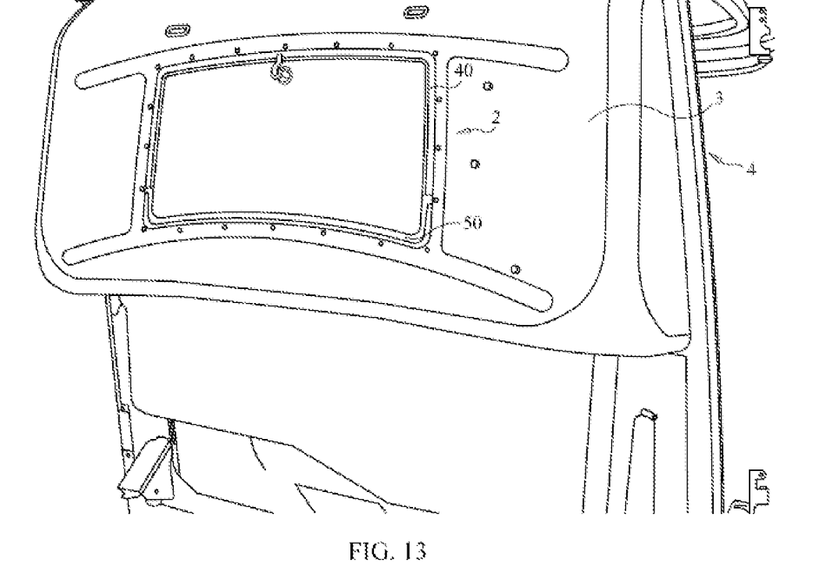
Figure 14:
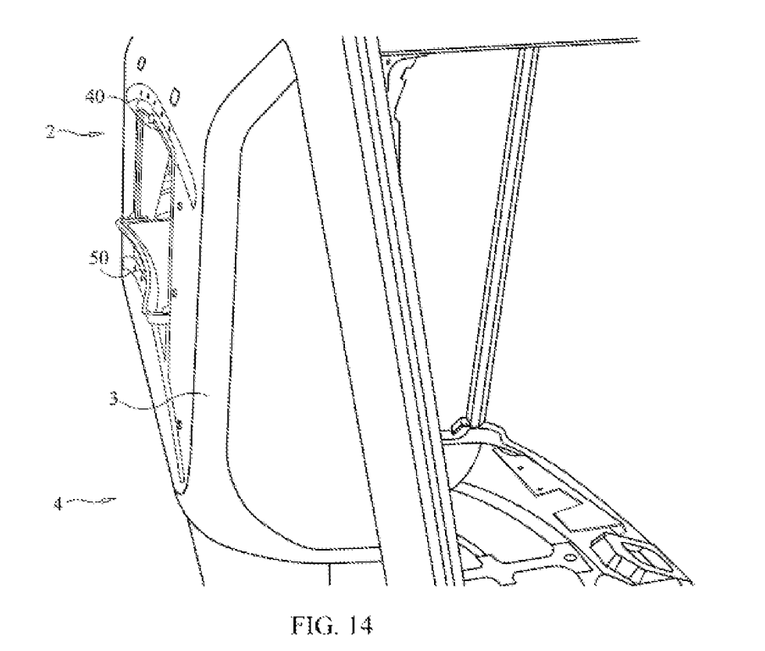

FIGS. 11-14 display a tiltable window 2 with hinge assemblies 1 according to the invention. In addition, this tilting frame 2 is provided in a vehicle cabin 3. FIGS. 11 and 12 display a view of the inside of such a cabin 3. FIGS. 13 and 14 display similar views, but from the outside of the cabin. In this embodiment of the tiltable window 2, both hinge assemblies are arranged mirror-symmetrically on the sides of the fixed frame 40 and the rotatable frame 50. In addition, the hinge shafts 10 of both hinge assemblies 1 are in line with one another. As can be seen, both the first zones 70 of the two hinge assemblies are connected to each other via the top side of both frames 40, 50, as well as the second zones 74 via the bottom side of both frames. The tiltable window 2 can thus tilt around these, approximately horizontal, hinge shafts 10 between the open and the closed position. According to an alternative embodiment, both hinge assemblies 1 can be implemented in a similar way in the top and bottom side of the frames 40, 50 so that the tilting frame 2 can tilt around the, approximately, vertical hinge shafts 10. According to the variant embodiments not shown, both hinge assemblies 1 can also be arranged not, or not completely, mirror-symmetrically. There are still alternative embodiments further conceivable in which both hinge assemblies 1, in place of an approximate horizontal or vertical hinge shafts 10, can comprise hinge shafts 10 that are mounted at another specific angle, whereby the hinge assembly 1 are arranged, for example, at different heights on the side profiles.

It is furthermore also clear from FIGS. 11-14 that the hinge assemblies 1 and the tiltable frame 2 are so arranged in the vehicle cabin 3 that the first zone 70 of the hinge assembly 1 forms the upper part of the window 2 and the second zone 74 of the hinge assembly 1 forms the lower part of the window 2. In addition, the first zone 70 of the rotatable frame part 50 in the opened position is tilted towards the inside of the cabin 3, as shown in FIG. 12, with the result that the rear side of the window 2 is easily accessible for cleaning.

As can be seen in FIG. 14, the second zone 74 of the rotatable frame part 50 is tilted to the outside of the cabin 3 when opening the tiltable window 2. As the first zone 70 is larger than the second zone 74 in this preferred embodiment, the distance by which said window, even in its extreme open position, sticks out from the rear of the cabin 3, is limited. Still, this construction prevents that dust or moisture, that has accumulated in the vicinity of the seal 60, is drawn into the cabin 3, since this zone 74 of the rotatable frame part 50 moves toward the outside of the cabin 3. Limiting the distance by which the window extends to the outside is advantageous, in particular when such a tiltable window 2 is used in a vehicle that comprises a structure that is mounted at a predetermined distance from the tiltable window 2. It is then sufficient to apply the hinge assemblies, according to the invention, in such a way that the rotatable frame part 50 does not bridge this distance in the opened position. This is, for instance, the case for a combine harvester, where one often mounts a tiltable window 2 in the rear wall of the cabin 3 to inspect the content of the grain tank through a second fixed window in the grain tank. However, the space between the grain tank and the cabin 3 is limited. Moreover, a tiltable window 2 that is mounted in a cabin 3 of a combine harvester must be able to resist dust, moisture and noise for a long time and in a reliable way. Moreover, it is necessary that one can clean such a tiltable window 2 in an ergonomic way, since it is very difficult, or even impossible, to reach the window 2 from the outside, due to the presence of the grain tank.

It is clear that a number of variations and combinations of the described embodiments also fall within the scope of protection of the invention, as defined by the claims and dependent claims.

The invention claimed is:

1. A hinge assembly for a tiltable window for a vehicle cabin, the hinge assembly comprising:
   a hinge shaft mounted according to a transverse direction, at right angles with respect to a depth direction, wherein the transverse direction and the depth direction are also at right angles with respect to a longitudinal direction;
   a fixed hinge part and a rotatable hinge part configured to rotate relative to the fixed hinge part around the hinge shaft;
   a fixed frame part and a rotatable frame part whereon, in the depth direction, on top, respectively the fixed hinge part and the rotatable hinge part are mounted, whereby this fixed frame part extends according to the longitudinal direction on either side of the hinge shaft and whereby this rotatable frame part is configured to rotate between at least two positions:
      a first, closed position in which in the transverse direction, the rotatable frame part on both sides of the hinge shaft is approximately in line with the fixed frame part; and
      a second, open position in which in the transverse direction, the rotatable frame part is at an angle relative to the fixed frame part; and
   a seal mounted between the fixed frame part and the rotatable frame part, wherein the fixed frame part and the rotatable frame part, respectively comprise continuous, substantially parallel profile elements that extend to the bottom according to the depth direction; and
   the seal is mounted continuously to the profile element of at least one of the fixed and rotatable frame part and is configured to bridge the distance between both profile elements in the closed position; and
   wherein the fixed and the rotatable frame part in the closed position, according to the longitudinal direction, comprises three zones: a first zone at a first side of the hinge shaft up to a first endpoint; a second zone on the opposite side of the hinge shaft up to a second endpoint; and a transition zone at the height of the hinge shaft, located between the first zone and the second zone from the first endpoint to the second endpoint;
   wherein at least at the height of the transition zone in the closed position, both profile elements, with respect to the depth direction, are at an angle relative to the longitudinal direction.

2. A hinge assembly according to claim 1, wherein in the first zone:
   the fixed frame part comprises, below the seal with respect to the depth direction, a transverse profile element connected to the profile element of the fixed frame part and at least extends according to the transverse direction up to the parallel profile element of the rotatable frame part; and
   the rotatable frame part, at the upper s de of the seal with respect to the depth direction, comprises a second transverse profile element that at least extends with respect to the transverse direction from the profile element up to the parallel profile element of the fixed frame part.

3. A hinge assembly according to claim 1, wherein in the second zone:
   the rotatable frame part, below the seal with respect to the depth direction, comprises a transverse profile element connected to the profile element of the rotatable frame part and extends at least up to the parallel profile element of the fixed frame part, according to the transverse direction; and
   the fixed frame part, at the upper side of the seal with respect to the depth direction, at least extends according to the transverse direction, from the profile element up to the parallel profile element of the rotatable frame part.

4. A hinge assembly according to claim 1, wherein in the transition zone:
   the rotatable frame part, below the seal with respect to the depth direction, comprises a transverse profile element connected to the profile element of the rotatable frame part and at least extends according to the transverse direction up to the parallel profile element of the fixed tram part; and
   the rotatable frame part, at the upper side of the seal with respect to the depth direction, comprises a second transverse profile element that at least extends according to the transverse direction from the profile element to the parallel profile element of the fixed frame part.

5. A hinge assembly according to claim 1, wherein the transverse profile element of the fixed frame part forms an abutment for the transverse profile element of the rotatable frame part at the height of the first endpoint.

6. A hinge assembly according to claim 1, wherein the seal comprises a balloon-shaped component.

7. A hinge assembly according to claim 6, wherein the balloon-shaped component comprises an abutment inside that limits compressibility according to the transverse direction.

8. A hinge assembly according to claim 1, wherein the seal is provided with a friction-reducing layer at its contact surface.

9. A tiltable window for a cabin of a vehicle comprising two hinge assemblies, wherein each hinge assembly comprises a hinge shaft mounted according to a transverse direction, at right angles with respect to a depth direction, wherein the transverse direction and the depth direction are also at right angles with respect to a longitudinal direction, a fixed hinge part and a rotatable hinge part configured to rotate relative to the fixed hinge part around the hinge shaft, a fixed frame part and a rotatable frame part whereon, in the depth direction, on top, respectively the fixed hinge part and the rotatable hinge part are mounted, whereby this fixed frame part extends according to the longitudinal direction on either side of the hinge shaft and whereby this rotatable frame part is configured to rotate between at least two positions:
   a first, closed position in which, viewed in the transverse direction, the rotatable frame part on both sides of the hinge shaft is approximately in line with the fixed frame part; and
   a second, open position in which, viewed in the transverse direction, the rotatable frame part is at an angle relative to the fixed frame part and a seal mounted between the fixed frame part and the rotatable frame part,
wherein the fixed frame part and the rotatable frame part, respectively comprise continuous, substantially parallel profile elements that extend to the bottom according to the depth direction; and the seal is mounted continuously to the profile element of at least one of the fixed and rotatable frame part and Is configured to bridge the distance between both profile elements in the closed position; and wherein the fixed and the rotatable frame part in the closed position, according to the longitudinal direction, comprises three zones: a first zone at a first side of the hinge shaft up to a first endpoint; a second zone on the opposite side of the hinge shaft up to a second endpoint; and a transition zone at the height of the hinge shaft, located between the first zone and the second zone from the first endpoint to the second endpoint;

wherein at least at the height of the transition zone in the closed position, both profile elements, with respect to the depth direction, are at an angle relative to the longitudinal direction;

wherein both hinge assemblies are mounted on opposite sides of the window; and the hinge shafts of both hinge assemblies are in line with one another.

10. A tiltable window according to claim 9, wherein:
the first zone of both hinge assemblies re connected to each other; and
the second zone of both hinge assemblies are connected to each other.

11. A vehicle comprising:
a tillable window comprising two hinge assemblies, wherein each hinge assembly comprises a hinge shaft mounted according to a transverse direction, at right angles with respect to a depth direction, wherein the transverse direction and the depth direction are also at right angles with respect to a longitudinal direction, a fixed hinge part and a rotatable hinge part configured to rotate relative to the fixed hinge part around the hinge shaft, a fixed frame part and a rotatable frame part whereon, in the depth direction, on top, respectively the fixed hinge part and the rotatable hinge part are mounted, whereby this fixed frame part extends according to the longitudinal direction on either side of the hinge shaft and whereby this rotatable frame part is configured to rotate between at least two positions:
  a first, closed position in which, viewed in the transverse direction, the rotatable frame part on both sides of the hinge haft is approximately in line with the fixed frame part; and
  a second, open position in which, viewed in the transverse direction, the rotatable frame part is at an angle relative to the fixed frame part and a seal mounted between the fixed frame part and the rotatable frame part,
wherein the fixed frame part and the rotatable frame part, respectively comprise continuous, substantially parallel profile elements that extend to the bottom according to the depth direction; and the seal is mounted continuously to the profile element of at least one of the fixed and rotatable frame part and is configured to bridge the distance between both profile elements in the closed position; and
wherein the fixed and the rotatable frame part in the closed position, according to the longitudinal direction, comprises three zones: a first zone at a first side of the hinge shaft up to a first endpoint; a second zone on the opposite side of the hinge shaft up to a second endpoint; and a transition zone at the height of the hinge shaft, located between the first zone and the second zone from the first endpoint to the second endpoint,
wherein at least at the height of the transition zone in the closed position, both profile elements, with respect to the depth direction, are at an angle relative to the longitudinal direction
wherein both hinge assemblies are mounted on opposite sides of the window;
and the hinge shafts of both hinge assemblies are in line with one another; and
  a cabin in which the tiltable window is mounted and that the hinge assemblies are fitted so that:
    the first zone forms the upper part of the window and the second zone the lower part of the window, and
    the first zone of the rotatable frame part in the opened position is tilted to the inner side of the cabin and the second zone of the rotatable frame part to the outside of the cabin.

12. A vehicle according to claim 11, wherein the first zone is larger than the second zone.

13. A vehicle according to claim 11, wherein the vehicle comprises a structure at a specific distance from the tiltable window and that the hinge assemblies are mounted such that the rotatable frame part in the opened position does not extend beyond the distance.

14. A vehicle according to claim 11, wherein the vehicle is a combine harvester; the structure is a grain tank and the tiltable window is mounted in a rear wall of the cabin.

* * * * *